United States Patent [19]

Opdahl et al.

[11] Patent Number: 4,859,022

[45] Date of Patent: Aug. 22, 1989

[54] MOVING "S" FIBER OPTICAL SWITCH

[75] Inventors: Barry J. Opdahl; Douglas H. Hooren, both of Williamsport, Pa.; Lauren F. Calaby, Huntington Beach, Calif.

[73] Assignee: GTE Products Corporation, Stamford, Conn.

[21] Appl. No.: 217,527

[22] Filed: Jul. 11, 1988

[51] Int. Cl.$^4$ .............................................. G02B 6/36
[52] U.S. Cl. ................................ 350/96.20; 350/96.15
[58] Field of Search ............. 350/96.10, 96.13, 96.14, 350/96.15, 96.18, 96.20, 96.21, 96.22

[56] References Cited

U.S. PATENT DOCUMENTS

| | | | |
|---|---|---|---|
| 4,322,126 | 3/1982 | Minowa et al. | 350/96.20 |
| 4,568,143 | 2/1986 | Yamada et al. | 350/96.20 |

FOREIGN PATENT DOCUMENTS

| | | | |
|---|---|---|---|
| 3012450 | 10/1981 | Fed. Rep. of Germany | 350/96.20 |
| 2479993 | 10/1981 | France | 350/96.15 |
| 54-13349 | 1/1979 | Japan | 350/96.20 |
| 58-117504 | 7/1983 | Japan | 350/96.13 |

Primary Examiner—John D. Lee
Attorney, Agent, or Firm—William H. McNeill

[57] ABSTRACT

A fully-reversing 2×2 electromechanical optical switch apparatus is set forth. Input optical signals, carried on input optical fibers, are selectively transmitted to output optical fibers in a binary relationship. The invention utilizes a pair of supports which reciprocate with respect to one another, in which one or more of the supports carry one or more loops of optical fiber for switching the path of optical data carried on a fiber.

15 Claims, 4 Drawing Sheets

MOVING "S" FIBER OPTICAL SWITCH

CROSS-REFERENCE TO RELATED APPLICATIONS

Related U.S. Pat. applications include Ser. No. 217,525, by Lauren F. Calaby (one of the co-inventors of this application), entitled "Movable- Fiber Array Optical Switch With Liquid Guiding"; Ser. No. 217,526, by Lauren F. Calaby (the same inventor as identified hereinabove), entitled "Movable Planar Waveguide Array Optical Switch"; and Ser. No. 217,521 by Barry J. Opdahl (another co-inventor of the instant application) entitled "Movable Fiber Array Optical Switch", all of which are filed contemporaneously herewith with and assigned to related assignees and all of which are now abandoned.

BACKGROUND OF THE INVENTION

1. Field of the Invention

This invention relates to a moving "S" fiber array optical switch and, in particular, to a fully-reversing 2×2 electromechanical optical switch apparatus in which input optical signals carried on input optical fibers can be selectively transmitted to output optical fibers. Accordingly, it is a general object of this invention to provide new and improved switch apparatus of such character.

2. General Background

Mechanical optical switching devices have been described in the literature. For example, U.S. Pat. No. 4,239,331 to Aoyama, issued Dec. 16, 1960, discusses an optical switching device for use with optical fibers. The fibers are positioned on input and output sides of the switch, with each fiber terminated by a lens for collimating incident light emitted from an input optical fiber. At least one transparent dielectric plate, with a uniform refractive index, is disposed between lenses associated with the input and the output sides of the switch. The transparent plate changes the optical transmission path of the collimated light beam when present in a light transmission path. When the transparent dielectric plate is driven into the light transmission path, the optical axis is switched from one to a different output optical fiber.

Mechanical optical switching devices are disclosed in U.S. Pat. No. 4,322,126 to Minowa et al. There, a mechanical optical switching device has a plurality of input optical fibers coupled to the input side thereof for receiving incoming light beam signals. Individually associated with each optical fiber is an input collimating lens which is positioned to receive the incoming light beam and to convert it into parallel light beams. Optical path-switching means, having uniform refractive index, are disposed at the rear or output of the input lens for switching the optical paths of the collimated light beams emerging from the input lens beam. A plurality of output optical fibers have individually associated output lenses for focusing the parallel light beams, after they have passed through the position controlled by the optical path-switching means. An electrically controlled, mechanical switching device selectively inserts or removes the optical path-switching means into or away from a predetermined position in order to switch light from any incoming fiber to any outgoing fiber.

U.S. patent application Ser. No. 129,502, filed Dec. 7, 1987, entitled "Fiber Optical Switch", (U.S. Pat. No. 4,790,621) assigned to GTE Products Corporation, discloses a 2×2 optical switch which employs a six-faced prism that can be moved from a first position to a second position. Mechanical latching means were used to maintain the second position without the necessity of applying continuous power to the moving means which preferably is a solenoid.

SUMMARY OF THE INVENTION

Another object of the invention is to provide a new and improved fiber array optical switch in which switching time and power dissipation is minimal.

Still another object of the invention is to provide a new and improved movable fiber array optical switch in which fewer fiber segments (than the prior art) need to be aligned and mated, thus reducing overall device insertion loss.

In accordance with one aspect of the invention, a fully-reversing 2×2 electromechanical optical switch apparatus, having input optical signals that are carried on input optical fibers, selectively transmits to output optical fibers. The optical switch apparatus includes a pair of bases, two pairs of optical fibers, and two fiber segments. The first base has a planar surface having a pair of continuous parallel V-grooves formed therein. The V-grooves have a fixed depth and are spaced apart a fixed distance terminating at a linear side of the planar surface. The surface further has a discontinuous semicircular V-groove having a pair of ends terminating at a linear side of the planar surface. The pair of ends are spaced apart the fixed distance. The discontinuous V-groove, at the pair of ends, has a depth equal to the fixed depth. The semicircular V-groove encroaches on one of the continuous parallel V-grooves but is discontinuous thereat. One of the ends is located a short distance from one of the parallel V-grooves. The second base has a planar surface terminating at a linear side thereof. The second base is movable with respect to the first base, with the two sides being in abutting but sliding relationship along a linear direction along the sides. A pair of continuous parallel V-grooves, having a fixed depth corresponding to the first base fixed depth and being spaced apart a fixed distance corresponding to the first base fixed distance, is formed in the surface of the second base, terminating at a linear side thereof. The surface of the second base has a discontinuous semicircular V-groove formed therein having a pair of ends terminating at the foregoing linear side thereof. The latter pair of ends is spaced apart the fixed distance. The second base discontinuous semicircular V-groove, at the second base pair of ends, has a depth equal to the fixed depth. The second base semicircular V-groove encroaches on one of the second base continuous parallel V-grooves, but is discontinuous thereat. One end of the second base discontinuous semicircular V-groove is located a short distance from one of the second base parallel V-grooves. One of the pairs of optical fibers is cemented in place in the parallel V-grooves of the first base, the fibers having end faces thereof terminating at the linear side of the first base. A first fiber segment is coupled to the discontinuous semicircular V-groove of the first base, with end faces of the segment terminating at the linear side. The first fiber segment is cemented to rest within the discontinuous semicircular V-groove at its linear side. The second pair of optical fibers is cemented in place in the parallel V-grooves of the second base having end faces thereof terminating at the linear side of the second base. A second fiber segment is coupled to the discontinuous semicircular V-groove of the second base, with end faces of the second segment terminating at the linear side of the second base. The second fiber segment is cemented to rest within the discontinuous semicircular V-groove at the latter linear side.

In accordance with certain features of the invention, the fiber end faces lie in parallel planes. The apparatus can further include means for limiting movement of the second base with respect to the first base and means for moving the second base with respect to the first base.

In accordance with another aspect of the invention, a fully-reversing 2×2 electromechanical optical switch apparatus, having input optical signals that are carried on input optical fibers, selectively transmits to output optical fibers. The apparatus includes a base, two pairs of optical fibers, a V-block, a third pair of optical fibers, and two fiber segments. The base has a planar surface having a first V-groove formed therein. The surface has a pair of parallel V-grooves formed therein at an angle with the first V-groove. The parallel V-grooves have a depth less than that of the first V-groove, whereby the first V-groove interrupts the pair of parallel V-grooves and the parallel V-grooves intersect the first V-groove at both sides thereof. The first pair of optical fibers reside within the pair of parallel V-grooves that are wholly at one of the sides of the first V-groove. The first pair of optical fibers have fiber end faces that lie in a first common plane. The second pair of optical fibers reside within the pair of parallel V-grooves oriented wholly at the other of the sides of the first V-groove. The second pair of optical fibers have fiber end faces lying in a second common plane. The V-block is adapted for reciprocating movement from one position to another, linearly within the first V-groove. The V-block has a pair of parallel V-grooves formed therein at an angle with the first V-groove and spaced apart at a fixed distance, whereby when the V-block is at the one linear position within the first V-groove, the pairs of parallel V-grooves in the V-block and on the surface are co-aligned. The V-block has a first side in slidable engagement with the one side of the first V-groove and has a second side in slidable engagement with the other side of the first V-groove. The V-block has a first discontinuous semicircular V-groove which has a pair of ends terminating at the first side. The pair of ends of the first discontinuous semicircular V-groove has a depth equal to the depth of the parallel V-grooves. The semicircular V-groove encroaches one of the parallel V-grooves of the V-block but is discontinuous thereat. One of the ends of the first V-groove is located a short distance from one of the parallel V-grooves. A second discontinuous semicircular V-groove has a pair of ends terminating at the second side. The pair of ends of the second discontinuous semicircular V-groove are spaced apart the fixed distance. The second discontinuous semicircular V-groove at the second side has a depth equal to that of the fixed depth. The second semicircular V-groove encroaches one of the parallel V-grooves of the V-block, but is discontinuous thereat. One of the second discontinuous semicircular V-groove ends is located the short distance from one of the V-block parallel grooves. The third pair of optical fibers reside within the pair of parallel V-grooves that are formed in the V-block. The third pair of optical fibers have a first set of fiber end faces lying in a third common plane. The third plane is in close proximity to the first plane. The third pair of optical fibers have a second set of fiber end faces lying in a fourth common plane. The fourth plane is in close proximity to the second plane. A first fiber segment is coupled to the first discontinuous semicircular V-groove of the first V-block with ends of the segment terminating at the first side. The first fiber segment is cemented to rest within the first discontinuous semicircular V-groove at the first side and to overlap one of the third pair of optical fibers. A second fiber segment is coupled to the second discontinuous semicircular V-groove at the first V-block with ends of the second fiber segment terminating at the second side. The second fiber segment is cemented to rest within the second discontinuous semicircular V-groove at the second side, and to overlap that one of the third pair of optical fibers. The first segment has fiber end faces lying in a third common plane, and the second segment has fiber end faces lying in a fourth common plane.

In accordance with certain features of the invention, the angle of the parallel V-grooves formed in the base with the first V-groove and the angle of the parallel V-grooves formed in the V-block with the first V-groove are identical. The angle can be 90°. The fiber end faces can lie in parallel planes. The apparatus can further include means for limiting movement of the V-block with respect to the base and means for moving the V-block with respect to the base.

In accordance with still another embodiment of the invention, a fully-reversing 2×2 electromechanical optical switch apparatus, having input optical signals that are carried on input optical fibers, selectively transmits to output optical fibers. The apparatus includes a base, several pairs of optical fibers, a V-block, and four fiber segments. The base has a planar surface with a V-groove formed therein. The surface has a first pair of non-parallel V-grooves formed therein at one side of the first V-groove and converging thereat. The surface has a second pair of non-parallel V-grooves formed therein at the other side of the first V-groove converging thereat. The non-parallel V-grooves chimerically intersect at the first V-groove. The non-parallel V-grooves have a depth less than that of the first V-groove, whereby the first V-groove interrupts the pairs of non-parallel V-grooves and the non-parallel V-grooves intersect the first V-groove at both sides thereof. A first pair of optical fibers reside within the first pair of non-parallel V-grooves, wholly at one side of the first V-groove. The first pair of optical fibers have fiber end faces lying in a first common plane. A second pair of optical fibers reside within the second pair of non-parallel V-grooves wholly at the other side of the first V-groove The second pair of optical fibers have fiber end faces lying in a second common plane. The V-block is adapted for reciprocating movement from one position to another, linearly within the first V-groove. The V-block has opposing sides. The V-block has a straight V-groove, a first discontinuous V-groove, and a curved discontinuous V-groove. The straight V-groove is formed in the V-block from one of the opposing sides continuously to an opposite one of the opposing sides so aligned, when the V-block is in one position, with one of the first pair of non-parallel V-grooves and one of the second pair of non-parallel V-grooves. The first discontinuous V-groove is formed in the V-block and has a pair of ends terminating at the opposing sides thereof. The discontinuous V-groove at the pair of ends has a depth equal to the fixed depth. The discontinuous V-groove encroaches the continuous V-groove of the V-block but is discontinuous thereat. The discontinuous V-groove is so aligned, when the V-block is in the one position, with the other of the first pair of non-parallel V-grooves and the other of the second pair of non-parallel V-grooves. The curved discontinuous V-groove is formed in the V-block and has a pair of ends terminating at the opposing sides. The curved discontinuous V-groove at the pair of ends has a depth equal to the fixed depth. The curved discontinuous V-groove is discontinuous between the pair of ends thereof. The curved continuous V-groove that is formed in the V-block has a pair of ends that are terminated at the opposing sides of the V-block. The curved continuous V-groove has a depth equal to the fixed depth. The curved continuous V-groove is oriented, when the V-block is in the switched position, with the aforesaid one of the V-grooves of the first pair and the other of the V-grooves of the second pair. The curved discontinuous V-groove is oriented, when the V-block is in the switched position, with the other of the V-grooves of the first pair and the one of the V-grooves of the second pair. A first fiber segment resides in the straight continuous V-groove of the V-block having a first end at the one of the opposing sides and having a second end at the other opposing side. The second fiber segment is coupled to the first discontinuous V-groove of the V-block having a first end thereof at the one of the opposing sides, and having a second end thereof at the other opposing side. A mid-portion of the second fiber segment overlaps the first fiber segment. The third fiber segment is coupled to the curved discontinuous V-groove having a first end thereof at one of the opposing sides, and having a second end thereof at the other opposing side. A mid-portion of the third fiber segment overlaps both the first fiber segment and the second fiber segment. The fourth fiber segment resides in the curved continuous V-groove of the V-block and has a first end at one of the opposing sides and has a second end at the other opposing side. The fiber segments, at their first ends, have fiber end faces that lie in a third common plane. The third common plane is in close proximity to, and parallel with, the first common plane. The fiber segments, at their second ends have fiber end faces that lie in a fourth common plane. The fourth common plane is in close proximity to, and parallel with, the second common plane.

In accordance with certain features of the invention, the fiber end faces lie in parallel planes. The apparatus can further include means for limiting movement of the V-block with respect to the base and means for moving the V-block with respect to the base.

In accordance with still another aspect of the invention, a fully-reversing 2×2 electromechanical optical switch apparatus, in which input optical signals carried on input optical fibers 150 and 250 are selectively transmitted to output optical fibers 151 and 251 or to the optical fibers 251 and 151, respectively, is set forth. Such a switch apparatus includes a pair of bases, each base having a planar surface and a respective linear side thereto. The planar surface of the first base has two pairs of continuous parallel V-grooves formed therein parallel to each other. The first pair of continuous parallel V-grooves have a fixed depth and are spaced apart a fixed distance, terminating at the linear side of the first base. The second pair of continuous parallel V-grooves have a depth equal to the fixed depth, and are spaced apart the fixed distance, terminating at its linear side. One of the second pair of V-grooves is located a short distance from one of the first pair of V-grooves. The second base is movable with respect to the first base, with both of the sides being in abutting but sliding relationship along a linear direction along the sides. The second base has a first pair of continuous parallel V-grooves having a fixed depth corresponding to the first base fixed depth, being spaced apart a fixed distance corresponding to the first base fixed distance. The first pair of V-grooves of the second base terminate at its linear side. A second pair of continuous parallel V-grooves, having a fixed depth corresponding to the first base fixed depth, are spaced apart the fixed distance and terminate at the linear side of the second base. One of the second pair of V-grooves of the second base is located the short distance from one of the first pair of V-grooves of the second base. A first pair of optical fibers 150, 251 are cemented in place in the first pair of parallel V-grooves of the first base, their end faces terminating at the first linear side of the first base. One fiber segment is coupled to the second pair of parallel V-grooves of the first base, with end faces thereof terminating at the first linear side of the first base. The first fiber segment are cemented to the second pair of V-grooves of the first base to have end portions of the segment rest therewithin, with a mid, bight portion of the segment lying outside of the first base. A second pair of optical fibers 151, 250 are cemented in place in the first pair of parallel V-grooves of the second base, their end faces being terminated at the linear side of the second base. A second fiber segment is coupled to the second pair of parallel V-grooves of the second base, end faces of the second segment terminating at the linear side of the second base. The second fiber segment is cemented to the second pair of V-grooves of the second base, end portions of the second segment resting therewithin, with a mid, bight portion extending outside the second base.

In accordance with certain features, the fiber end faces lie in parallel planes. The apparatus can include means for limiting movement of the second base with respect to the first base, and means for moving the second base with respect to the first base. The apparatus can further include housing means for enclosing the two bases, the fiber segments, and the means for limiting movement.

BRIEF DESCRIPTION OF THE DRAWING

Other objects, advantages, and features of this invention, together with its construction and mode of operation, will become more apparent from the following description, when read in conjunction with the accompany drawing, in which.

DESCRIPTION OF PREFERRED EMBODIMENTS

Figure 1A:
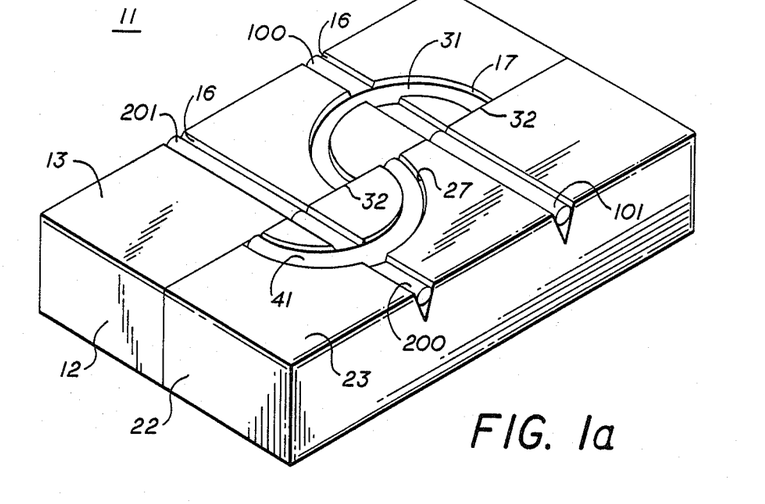
FIG. 1A is a perspective view of one embodiment of the invention depicting the optical switch in a through position.
Figure 1B:
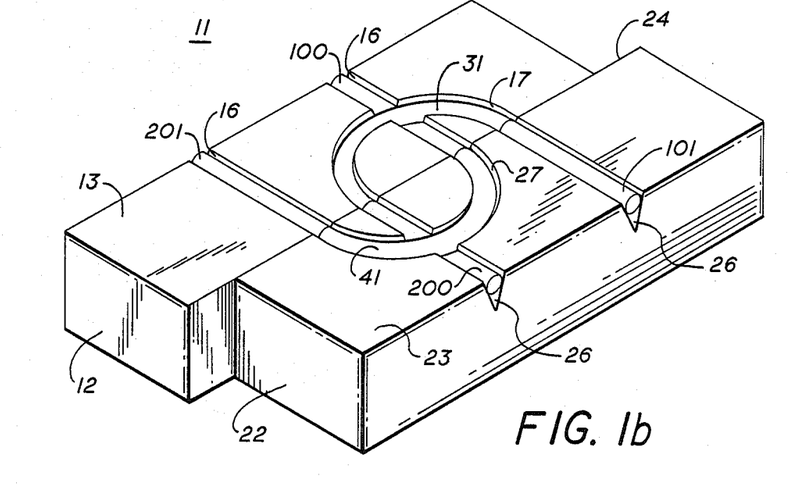
FIG. 1B is a perspective view of the embodiment depicted in FIG. 1A showing the optical switch in a switched position.

Referring to FIGS. 1A and 1B, there is shown, respectively, the normal through position and the bypassed switched position of a fully-reversing 2×2 electromechanical optical switch apparatus 11. As shown, the apparatus 11 includes a first base 12 and a second base 22. The bases 12, 22 have planar surfaces 13, 23, respectively, and have abutting linear sides 14, 24, respectively (see FIG. 1B). A pair of continuous parallel V-grooves 16, 16, having a fixed depth and spaced apart a fixed distance, are formed in the planar surface 13 of the first base 12. Similarly, the planar surface 23 of the base 22 has a pair of continuous parallel V-grooves 26, 26 formed therein with a depth corresponding to the depth of the grooves 16, 16 and spaced apart the same distance.

A discontinuous semicircular V-groove 17 is formed on the planar surface 13 of the base 12 having a fixed depth at the end thereof at the linear side 14 and spaced apart the aforesaid fixed distance. In a similar fashion, a discontinuous semicircular V-groove 27 is formed in the planar surface 23 of the second base 22. The discontinuous V-groove 27 has a pair of ends at the linear side 24 of the second base 22 having a corresponding fixed depth and having their ends spaced apart the fixed distance.

A pair of optical fibers 100, 201 are cemented in place in the V-grooves 16, 16 of the first base 12. The fibers 100, 201 are of such diameter as to be comfortably positioned within the V-grooves 16, 16. Preferably, their diameters are such that the fibers do not raise substantially above the surface 13 of the base 12. This particular configuration is not critical as it would vary with the angle of the V-groove.

In a similar fashion, the base 22 has a pair of optical fibers 101, 200 cemented in place in the V-grooves 26, 26. Thus, when the base 22 is in the through position with relationship to the base 12 (FIG. 1A), end faces of the fibers 101 and 200 meet face to face with end faces of the fibers 100 and 201.

A fiber segment 31 is mounted in the discontinuous semicircular V-groove 17 in such a fashion that its end faces 32, 32 are planar with the linear side 14. The fiber segment 31, while resting in the discontinuous V-groove, overlaps the fiber 100, thus not directly intersecting therewith.

Similarly, the second base 22 has a fiber segment 41 whose end faces are planar with the linear side 24. The fiber segment 41 rests within the discontinuous V-groove 27 and overlaps the optical fiber 200.

Thus, as described hereinabove, as viewed in FIG. 1A, a signal sent on optical fiber 100 can be transmitted directly to optical fiber 101 and vice versa. Likewise, an optical signal transmitted on an optical fiber 201 can be transmitted to optical fiber 200 and vice versa.

Via means (see Figs 1C and 1D) for moving the base 22 with respect to the base 12 in a direction parallel to their linear sides 14, 24, the switch can be thrown to the switched position as indicated in FIG. 1B. As shown therein, a signal transmitted along the optical fiber 100 passes through the fiber segment 41 on the base 22 and is transmitted along the fiber 201 on the base 12. Alternatively (or simultaneously), a signal can be sent in the opposite direction, from the fiber 201 through the fiber segment 41 and back to the optical fiber 100. Likewise, the optical fiber 101 is coupled to the optical fiber 200 by means of the fiber segment 31, and a signal can be sent in either direction.

Thus, in operation, signals can be transmitted from fibers 100 and 201 to and from the optical fibers 101 and 200, in either direction. When desired, the switch apparatus 11 can be actuated so that the switched position (as indicated in FIG. 1B) occurs in which a signal on the fiber 100 is switched from the fiber 101 to the fiber 201, and whereby a signal on the fiber 200 is switched from the fiber 201 to the fiber 101.

FIGS. 1A and 1B, as indicated earlier, depict perspective views of one embodiment of the invention that show the optical switch 11 in the through position and in the switched position, respectfully. Means for limiting movement of one base with respect to the other base is not shown for simplicity of illustration. Likewise, means for moving one base with respect to the other base is not shown for simplicity of illustration.

Figure 1C:
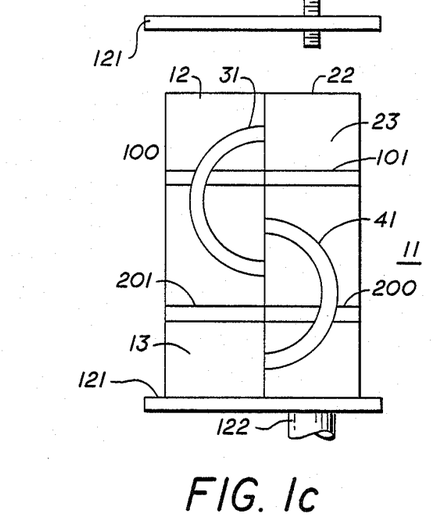
FIG. 1C is a top view of the embodiment depicted in FIG. 1A showing the optical switch in the normal through position, and further depicting means for positioning elements of invention.
Figure 1D:
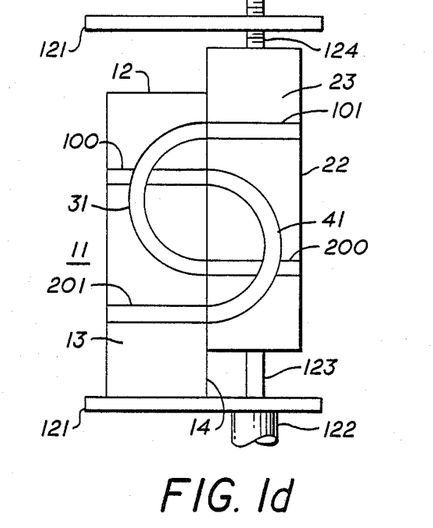
FIG. 1D is a top view of the embodiment depicted in FIG 1A showing the optical switch in the bypassed, switched position, and further depicting the means for positioning elements of the invention.

In order to further clarity and illustrate the embodiment of the invention, reference is made to FIGS. 1C and 1D which conform to FIGS. 1A and 1B. FIGS. 1C and 1D are top views of the embodiment shown in FIGS. 1A and 1B, with the addition of the limiting means and moving means.

The moving "S" optical fiber switch 11 is retained within a housing or positioning frame 121. A solenoid 122 (or other means of translation), coupled to the frame 121 or to a reference return block, when excited, causes a solenoid plunger 123 to impact upon the base 22, positioning it against an adjustable block stop 124 held by the housing 121.

When the solenoid 122 is unexcited, the plunger 123 retracts, withdrawing the base 22 to the normal position shown in FIG. 1C.

The foregoing explanation is not intended to limit the means for movement of one base with respect to the other base, nor is it intended to limit the means for moving one base with respect to the other base. The foregoing illustrates one of many possibilities.

For ease of comprehension and simplicity of description, the embodiments shown in FIGS. 2A, 2B, 3A, 3B, and 4 and explanation referring thereto do not depict the moving means or movement limiting means, in order that the pertinent aspects of the invention be better understood. Such means, or equivalents, can be used.

Figure 2A:
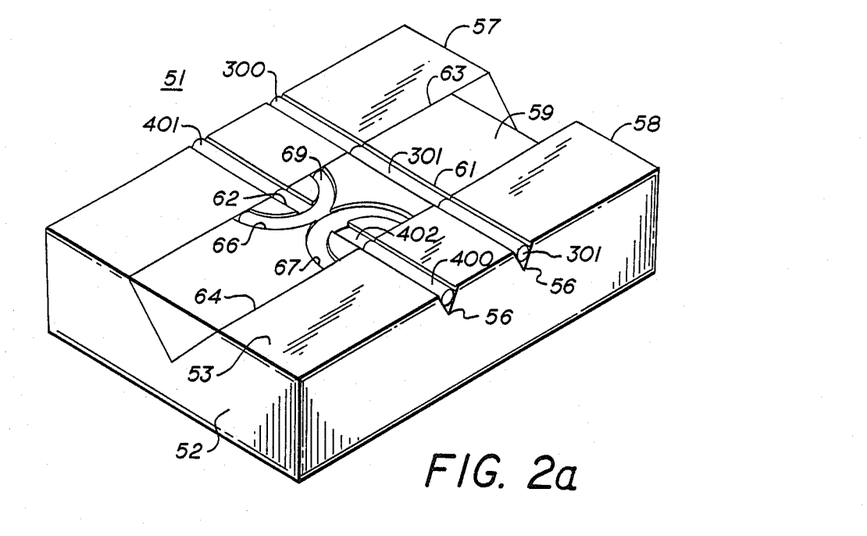
FIG. 2A is a perspective view of another embodiment of the invention showing an optical switch in a through position.
Figure 2B:
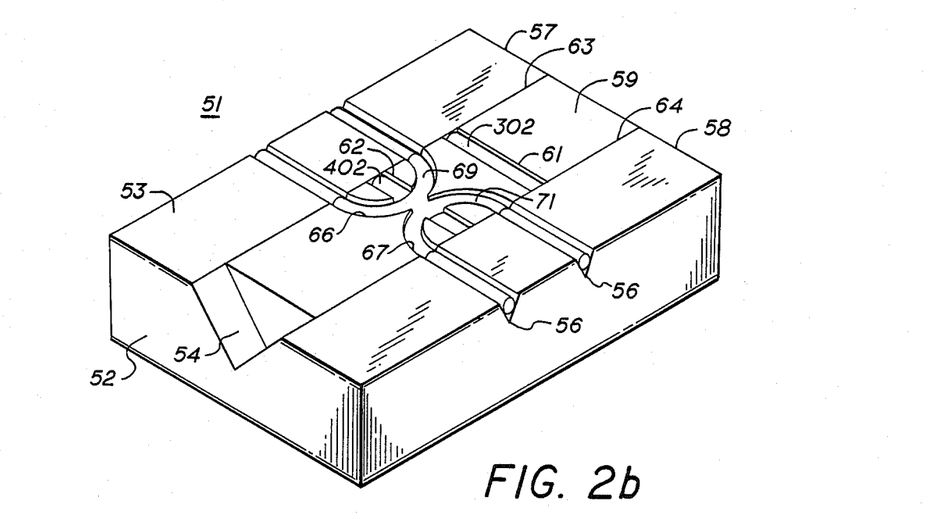
FIG. 2B is a perspective view of the embodiment depicted in FIG. 2A showing the switch in a switched position.

Another embodiment of the invention is depicted in FIGS. 2A and 2B showing, respectively, the through position and the switched position of a moving "S" fiber array optical switch with V-block. A fully-reversing 2×2 electromechanical optical switch apparatus 51 is depicted in FIGS. 2A and 2B wherein input optical signals carried on input optical fibers 300 and 400 can be selectively transmitted to output optical fibers 301 and 401 or to the optical fibers 401 and 301, respectively. The apparatus includes a base 52 which has a planar surface 53. The planar surface 53 has a first V-groove 54 formed therein. The surface 53 has a pair of parallel V-grooves 56, 56 that are formed therein at an angle with the first V-groove 54. The parallel V-grooves 56, 56 have a depth less than that of the first V-groove 54 whereby the first V-groove 54 interrupts the pair of parallel V-grooves 56, 56. The parallel V-grooves 56, 56 intersect the first V-groove 54 at both sides thereof.

A first pair of optical fibers 300, 401 reside within the pair of parallel V-grooves 56, 56 formed in the surface 53 wholly at one side 57 of the first V-groove 54. The first pair of optical fibers 300, 401 have fiber end faces lying in a first common plane.

A second pair of optical fibers 301, 400 reside within the pair of parallel V-grooves 56, 56 formed in the surface 53 wholly at the other side 58 of the first V-groove 54. The second pair of optical fibers 301, 400 have fiber end faces that lie in the second common plane.

A V-block 59, formed to fit within the first V-groove 54, is adapted for reciprocating movement from one position to another linearly within the first V-groove 54. The V-block 59 has a pair of parallel V-grooves 61, 62 that are formed therein at an angle with the first V-groove 54. The parallel V-grooves 61, 62 are spaced apart a fixed distance whereby, when the V-block 59 is at the one linear position within the first V-groove 54, the pairs of parallel V-grooves 61, 62 and 56, 56 are co-aligned. The V-block 59 has a first side 63 in slidable engagement with the one side 57 of the first V-groove 54 and has a second side 64 in slidable engagement with the other side 58 of the V-groove 54.

The V-block 59 has a first discontinuous semicircular V-groove 66 formed therein having a pair of ends at the first side 63. The pair of ends of the first discontinuous semicircular V-groove 66 have a depth equal to the depth of the parallel V-grooves 56, 56. The semicircular V-groove 66 encroaches upon one of the parallel V-grooves 56 of the V-block 59 but is discontinuous thereat.

A second discontinuous semicircular V-groove 67 has a pair of ends that terminate at the second side 64 of the V-block 59. The pair of ends of the second discontinuous semicircular V-groove 67 are spaced apart a fixed distance. The second discontinuous semicircular V-groove 67, at the side 64, has a depth equal to the fixed depth. The second semicircular V-groove 67 encroaches upon one of the parallel V-grooves 56 of the V-block 59 but is discontinuous thereat. One end of the second discontinuous semicircular V-grooves 67 is located the short distance from one of the V-block parallel grooves 61, 62.

A third pair of optical fibers 302, 402 reside within the pair of parallel V-grooves 61, 62 formed in the V-block 59. The third pair of optical fibers 302, 402 have a first set of fiber end faces that lie in a third common plane. The third common plane is in close proximity to the first plane. The third pair of optical fibers 302, 402 further have a second set of fiber end faces that lie in a fourth common plane. The fourth plane is in close proximity to the second plane.

A first fiber segment 69 is coupled to the first discontinuous semicircular V-groove 66 of the V-block 59. Ends of the first fiber segment 69 terminate at the first side 63 of the V-block 59. The first fiber segment 69 is cemented to rest within the first discontinuous semicircular V-groove 66 at the first side 63 of the V-block 59 and to overlap one 402 of the third pair of optical fibers 302, 402.

A second fiber segment 71, in similar fashion, is coupled to the second discontinuous semicircular V-groove 67 of the V-block 59. Ends of the second fiber segment 71 terminate at the second side 64 of the V-block 59. The second fiber segment 71 is cemented to rest within the second discontinuous semicircular V-groove 67 at the second side 64 of the V-block 59. The second fiber segment 71 overlaps the one 402 of the third pair of optical fibers. The first segment 69 has fiber end faces that lie in the third common plane. The second segment 71 has fiber end faces that lie in the fourth common plane.

As indicated above, the angle of the parallel V-grooves 56, 56 formed in the base with the first V-groove 54 and the angle of the parallel V-grooves formed in the V-block 59 with the V-groove 54 should be identical. Desirably, the angle is perpendicular or 90°. Preferably, the fiber end faces all lie in parallel planes.

Figure 3A:
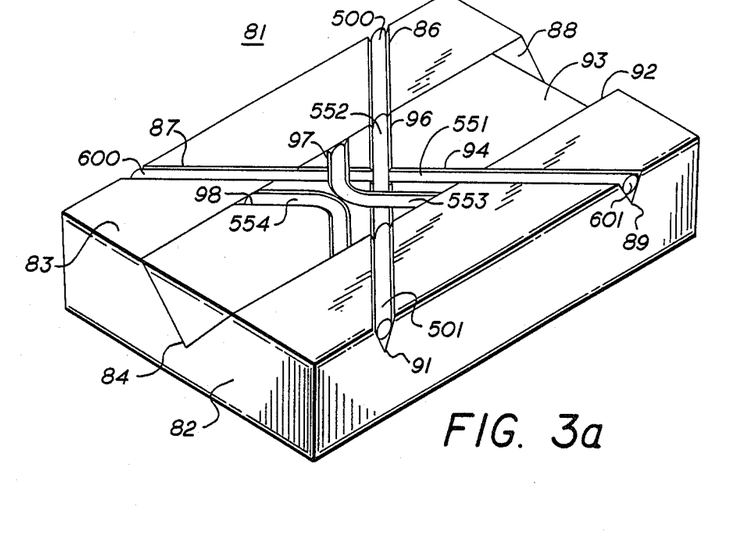
FIG. 3A is a perspective view of still another embodiment of the invention showing the switch in a through position.
Figure 3B:
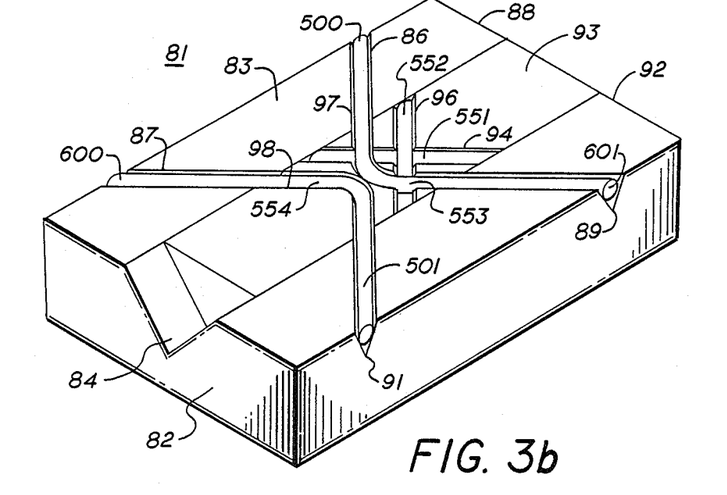
FIG. 3B is a perspective view of the device depicted in FIG. 3A showing the switch in a switched position.

FIG. 3 depicts still another embodiment of the invention showing a moving arc fiber array optical switch. As shown therein, it includes a fully reversing 2×2 electromechanical optical switch apparatus 81 in which input optical signals that are carried on input optical fibers 500 and 600 can be selectively transmitted to output optical fibers 501 and 601 or to the output optical fibers 601 and 501, respectively. The apparatus 81 includes a base 82 which has a planar surface 83. The planar surface 83 has a first V-groove 84 formed therein. The surface 83 has a first pair of non-parallel V-grooves 86, 87 that are formed therein at one side 88 of the V-groove 84, with the non-parallel V-grooves 86, 87 converging thereat. The surface 83 has a second pair of non-parallel V-grooves 89, 91 formed therewithin at the other side 92 of the first V-groove 84 with those non-parallel V-grooves 89, 91 converging thereat. The non-parallel V-grooves 86, 87 and 89, 91 chimerically intersect at the first V-groove 84. The non-parallel V-grooves 86, 87, 89, 91 have depths not exceeding that of the first V-groove 84 whereby the first V-groove 84 interrupts the pairs 86, 87 and 89, 91 of the non-parallel V-grooves. The non-parallel V-grooves 86, 87 and 89, 91 intersect the first V-groove 84 at both sides 88, 92 thereof.

A first pair of optical fibers 500 and 600 reside within the first pair of non-parallel V-grooves 86, 87 wholly at one side 88 of the first V-groove 84. The first pair of optical fibers 500, 600 have fiber end faces that lie in the first common plane. A second pair of optical fibers 601, 501 reside within the second pair of non-parallel V-grooves 89, 91 wholly at the other side 92 of the first V-groove 84. The second pair of optical fibers 601, 501 at the side 92 of the V-groove 84 have fiber end faces that lie in the second common plane.

A V-block 93, adapted for reciprocating movement from one position to another linearly within the first V-groove 84, has opposing sides and has a straight V-groove 94 formed therein from one of the opposing sides continuously to the opposite opposing side such that, upon alignment, the V-block 93 is in the one (through) position with one of the first pair of non-parallel V-grooves 87 and one of the second pair of non-parallel V-grooves 89.

A first discontinuous V-groove 96 is formed in the V-block 93 having a pair of ends that terminate at the opposite sides of the V-block 93. The discontinuous V-groove 96, at the pair of ends, have a depth equal to the fixed depth. The discontinuous V-groove 96 encroaches upon the continuous V-groove 94 of the V-block 93 but is discontinuous thereat. The discontinuous V-groove 96 is aligned, when the V-block 93 is in the one position, with the other 86 of the first pair of non-parallel V-grooves 86, 87 and the other 91 of the second pair of the non-parallel V-grooves 89, 91.

A curved discontinuous V-groove 97 is formed in the V-block 93 with a pair of ends that terminate at opposing sides of the V-block 93. The curved discontinuous V-groove 97 at the pair of ends have a depth equal to the fixed depth. The curved discontinuous V-groove 97 is discontinuous between the pair of ends thereof.

A curved continuous V-groove 98 is formed on the surface of the V-block 93, having a pair of ends that terminate at the opposing sides of the V-block 93. The curved continuous V-groove 98 has a depth equal to the fixed depth, oriented, when the V-block 93 is in a switched position, with one of the V-grooves 87 of the first pair 86, 87 and the other 91 of the V-grooves of the second pair 89, 91.

The curved discontinuous V-groove 97 is oriented with the other V-groove 86 of the first pair 86, 87 and the one V-groove 89 of the second pair 89, 91.

A first fiber segment 551 resides in the straight continuous V-groove 94 of the V-block 93, and has an end at each of the opposing sides of the V-block 93.

A second fiber segment 552 is coupled to the first discontinuous V-groove 96. The second fiber segment 552 has a first end thereof at one of the opposing sides of the V-block 93, has another end thereof at the other opposing side of the V-block 93, and has a mid-portion thereof that overlaps the first fiber segment 551.

A third fiber segment 553 is coupled to the curved discontinuous V-groove 97 with its first end at one of the opposing sides of the V-block 93 and a second end thereof at the other opposing side of the V-block 93. A mid-portion of the third fiber segment 553 overlaps both the first and the second fiber segments 551, 552.

A fourth fiber segment 554 resides in the curved continuous V-groove 98 of the V-block 93, has a first end at one of the opposing sides of the V-block 93 and has a second end at the other opposing side thereof. The fiber segments 551, 552, 553, 554 at the first ends have fiber end faces that lie in a third common plane that is in close proximity to and is parallel with the first common plane. The fiber segments 551, 552, 553, 554 at their second ends have fiber end faces that lie in a fourth common plane that is in close proximity to and is parallel with the first common plane.

Desirably, all fiber end faces associated with this apparatus lie in parallel planes. Means are provided for limiting movement of the V-block 93 with respect to the base 82, and means are provided for moving the V-block 93 with respect to the base 82.

Referring again to the drawing, it is noted that with the switch apparatus 81 placed in a through position, as depicted in FIG. 3A, a signal on the input fiber 500 is transmitted directly to the output fiber 501, whereas the signal on the input fiber 600 is transmitted directly to the output fiber 601 (the signals can be transmitted in the opposite direction). When the switch apparatus 81 is actuated so that it is in the switched position as depicted in FIG. 3B, a signal on the input fiber 500 is transmitted to the output fiber 601, whereas a signal on the input fiber 600 is transmitted to the output fiber 501 (again, signals can be transmitted in the opposite direction, if desired).

Figure 4:
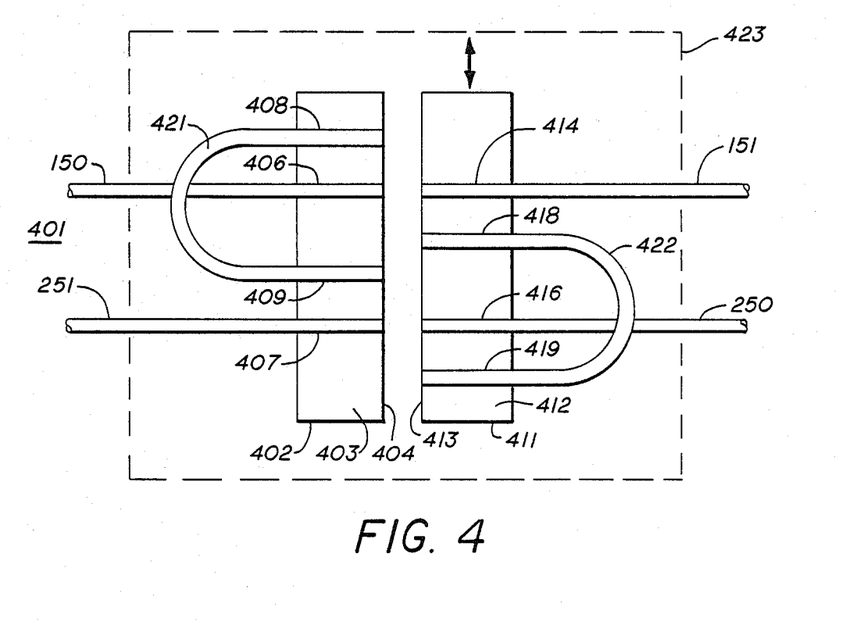
FIG. 4 is a top view of a preferred embodiment of the invention.

FIG. 4 depicts yet another embodiment of the invention, which is believed to be the best mode contemplated by the inventors for its practice. The embodiment depicted therein illustrates, in a top view, a fully-reversing 2×2 electromechanical optical switch apparatus 401 in which input optical signals carried on input optical fibers 150 and 250 can be selectively transmitted to output optical fibers 151 and 251 or to the output optical fibers 251 and 151, respectively. The apparatus 401 includes a first base 402 having a planar surface 403 that terminates at a first linear side 404 thereof. The planar surface 403 of the base 402 has a first pair of continuous parallel V-grooves 406, 407 formed therein having a fixed depth and being spaced apart a fixed distance so as to terminate at the linear side 404 of the base 402.

A second pair of continuous parallel V-grooves 408, 409 have a depth equal to the fixed depth. The second pair of V-grooves 408, 409 (parallel to the first pair 406, 407) are spaced apart the fixed distance and are terminated at the linear side 404 of the first base 402. One 408 of the second pair of V-grooves 408, 409 is located a short distance from one 406 of the first pair of continuous parallel V-grooves 406, 407. The second base 411 of the apparatus 401 has a planar surface 412 that terminates at a linear side 413 of the second base 411. The second base 411 is movable with respect to the first base 402 along a direction parallel with both of the sides 404, 413. The surface 412 of the second base 411 has two pair of parallel V-grooves formed therein.

A pair of optical fibers 150, 251 are cemented in place in the first pair of parallel V-grooves 406, 407 of the first base 402 and have their end faces terminating at the first linear side 404 thereof.

A first fiber segment 421 is coupled to the second pair of parallel V-grooves 408, 409 of the first base 402 with end faces of the segment 421 terminating at the first linear side 404. The first fiber segment 421 is cemented to the second pair of V-grooves 408 and 409 of the first base 402 to have end portions thereof rest therewithin with a mid-bight portion of the fiber segment 421 lying without the first base 402.

A second pair of optical fibers 151 and 250 are cemented in place in the first pair of parallel V-grooves 414, 416 of the second base 411 having their end faces terminating at the linear side 413 of the second base 411.

A second fiber segment 422 is coupled to the second pair of parallel V-grooves 418, 419 of second base 411 with end faces thereof terminating at the linear side 413 of the second base 411. The second fiber segment 422 is cemented to the second pair of V-grooves 418, 419 of the second base 411 to have their end portions rest therewithin with a mid-bight portion of the second fiber segment 422 lying without the second base 411.

In preferred embodiments, the fiber end faces lie in parallel planes. The apparatus can further include means for limiting movement of the second base 411 with respect to the first base 402.

Desirably, the overall apparatus 401 is housed within a suitable housing means 423 for enclosing the first base 402, the second base 411, the first fiber segment 421, the second fiber segment 422 and the means for limiting movement.

The housing 423 serves a desired purpose of protecting loose fibers, protection against dirt, and protection from the environment. The embodiment depicted in FIG. 4 is preferred as it is believed to be relatively easy to manufacture. Hence, it should be apparent to those skilled in the art that various modifications can be performed without departing from the spirit and scope of the invention.

What is claimed is:

1. A fully-reversing 2×2 electromechanical optical switch apparatus in which input optical signals carried on input optical fibers 100 and 200 can be selectively transmitted to output optical fibers 101 and or to said optical fibers 201 and 101, respectively, comprising a first base having a planar surface terminating at a first linear side thereof, said surface of said base having formed therein a pair of continuous parallel V-grooves having a fixed depth and being spaced apart a fixed distance, terminating at said linear side, and a discontinuous semicircular V-groove having a pair of ends terminating at said linear side, said pair of ends being spaced apart said fixed distance, said discontinuous V-groove at said pair of ends having a depth equal to said fixed depth, said semicircular V-groove encroaching one of said continuous parallel V-grooves but being discontinuous thereat, one of said ends being located a short distance from one of said parallel V-grooves;

a second base having a planar surface terminating at a linear side thereof, said second base being movable with respect to said first base, with both of said sides being in abutting but sliding relationship along a linear direction along said sides, said surface of said second base having formed therein a pair of continuous parallel V-grooves having a fixed depth corresponding to said first base fixed depth and being spaced apart a fixed distance corresponding to said first base fixed distance, terminating at said linear side of said second base, and a discontinuous semicircular V-groove having a pair of ends terminating at said linear side of said second base, said latter pair of ends being spaced apart said fixed distance, said second base discontinuous semicircular V-groove at said second base pair of ends having a depth equal to said fixed depth, said second base semicircular V-groove encroaching one of said second base continuous parallel V-grooves but being discontinuous thereat, one of said second base discontinuous semicircular V-groove ends being located said short distance from one of said second base parallel V-grooves;

a pair of optical fibers 100, 201 cemented in place in said parallel V-grooves of said first base having end faces thereof terminating at said first linear side of said first base;

a first fiber segment coupled to said discontinuous semicircular V-groove of said first base, with end faces of said segment terminating at said first linear side, said first fiber segment being cemented to rest within said discontinuous semicircular V-groove at said first linear side;

a second pair of optical fibers 101, 200 cemented in place in said parallel V-grooves of said second base having end faces thereof terminating at said linear side of said second base; and a second fiber segment coupled to said discontinuous semicircular V-groove of said second base, with end faces of said second segment terminating at said linear side of said second base, said second fiber segment being cemented to rest within said discontinuous semicircular V-groove at said linear side of said second base.

2. The apparatus as recited in claim 1 wherein said fiber end faces lie in parallel planes.

3. The apparatus as recited in claim 2 further comprising means for limiting movement of said second base with respect to said first base, and means for moving said second base with respect to said first base.

4. A fully-reversing 2×2 electromechanical optical switch apparatus in which input optical signals carried on input optical fibers 300 and 400 can be selectively transmitted to output optical fibers 301 and 401 or to said optical fibers 401 and 301, respectively, comprising a base having a planar surface with a first V-groove formed therein, said surface having a pair of parallel V-grooves formed therein at an angle with said first V-groove, said parallel V-grooves having a fixed depth less than that of said first V-groove, whereby said first V-groove interrupts said pair of parallel V-grooves, and said parallel V-grooves intersect said first V-groove at both sides thereof;

a first pair of optical fibers 300, 401 residing within said pair of parallel V-grooves wholly at one of said sides of said first V-groove, said first pair of optical fibers 300, 401 having fiber end faces lying in a first common plane;

a second pair of optical fibers 301, 400 residing within said pair of parallel V-grooves oriented wholly at the other of said sides of said first V-groove, said second pair of optical fibers 301, 400 having fiber end faces lying in a second common plane;

a V-block adapted for reciprocating movement from one position to another linearly within said first V-groove, said V-block having a pair of parallel V-grooves formed therein at said angle with said first V-groove, and spaced apart a fixed distance, whereby when said V-block is at said one linear position within said first V-groove, said pairs of parallel V-grooves on said V-block and on said surface are coaligned, said V-block having a first side in slidable engagement with said one side of said first V-groove and having a second side in slidable engagement with said other side of said first V-groove, said V-block having a first discontinuous semicircular V-groove having a pair of ends terminating at said first side, said pair of ends of said first discontinuous semicircular V-groove having a depth equal to said depth of said parallel V-grooves, said semicircular V-groove encroaching one of said parallel V-grooves of said V-block but being discontinuous thereat, one of said ends of said being located a short distance from one of said parallel V-grooves, and a second discontinuous semicircular V-groove having a pair of ends terminating at said second side, said pair of ends of said second discontinuous semicircular V-groove being spaced apart said fixed distance, said second discontinuous semicircular V-groove at said second side having a depth equal to said fixed depth, said second semicircular V-groove encroaching one of said parallel V-grooves of said V-block but being discontinuous thereat, one of said second discontinuous semicircular V-groove ends being located said short distance from one of said V-block parallel grooves;

a third pair of optical fibers 302, 402 residing within said pair of parallel V-grooves formed in said V-block, said third pair of optical fibers 302, 402 having
- a first set of fiber end faces lying in a third common plane, said third plane being in close proximity to said first plane, and
- a second set of fiber end faces lying in a fourth common plane, said fourth plane being in close proximity to said second plane;

a first fiber segment coupled to said first discontinuous semicircular V-groove of said V-block, with ends of said segment terminating at said first side, said first fiber segment being cemented to rest within said first discontinuous semicircular V-groove at said first side and to overlap one 402 of said third pair of optical fibers; and a second fiber segment coupled to said second discontinuous semicircular V-groove of said V-block, with ends of said second fiber segment terminating at said second side, said second fiber segment being cemented to rest within said second discontinuous semicircular V-groove at said second side and to overlap said one 402 of said third pair of optical fibers, said first segment having fiber end faces lying in said third common plane, and said second segment having fiber end faces lying in said fourth common plane.

5. The apparatus as recited in claim 4 wherein said angle of said parallel V-grooves formed in said base with said first V-groove, and said angle of said parallel V-grooves formed in said V-block with said first V-groove, are identical.

6. The apparatus as recited in claim 5 wherein said angle is 90°.

7. The apparatus as recited in claim 6 wherein said fiber end faces lie in parallel planes.

8. The apparatus as recited in claim 7 further comprising
- means for limiting movement of said V-block with respect to said base; and
- means for moving said V-block with respect to said base.

9. A fully-reversing 2×2 electromechanical optical switch apparatus in which input optical signals carried on input optical fibers 500 and 600 can be selectively transmitted to output optical fibers 51 and 601 or to said output optical fibers 601 and 501, respectively, comprising a base having a planar surface with a first V-groove formed therein, said surface having a first pair of non-parallel V-grooves formed therein at one side of said first V-groove and converging thereat, and said surface having a second pair of non-parallel V-grooves formed therein at the other side of said first V-groove and converging thereat, said non-parallel V-grooves chimerically intersecting at said first V-groove, said non-parallel V-grooves having a fixed depth less than that of said first V-groove, whereby said first V-groove interrupts said pairs of non-parallel V-grooves, and said non-parallel V-grooves intersect said first V-groove at both sides thereof;

a first pair of optical fibers 500, 600 residing within said first pair of non-parallel V-grooves wholly at one side of said first V-groove, said first pair of optical fibers 500, 600 having fiber end faces lying in a first common plane;

a second pair of optical fibers 601, 501 residing within said second pair of non-parallel V-grooves wholly at the other side of said first V-groove, said second pair of optical fibers 601, 501 having fiber end faces lying in a second common plane;

a V-block adapted for reciprocating movement from one position to another linearly within said first V-groove, said V-block having opposing sides, and said V-block having
- a straight V-groove formed therein from one of said opposing sides continuously to an opposite one of said opposing sides so aligned, when said V-block is in one position, with one of said first pair of non-parallel V-grooves and one of said second pair of non-parallel V-grooves,
- a first discontinuous V-groove formed therein having a pair of ends terminating at said opposing sides, said discontinuous V-groove at said pair of ends having a depth equal to said fixed depth, said discontinuous V-groove encroaching said continuous V-groove of said V-block but being discontinuous thereat, said discontinuous V-groove being so aligned, when said V-block is in said one position, with the other of said first pair of non-parallel V-grooves and the other of said second pair of non-parallel V-grooves,
- a curved discontinuous V-groove formed therein having a pair of ends terminating at said opposing sides, said curved discontinuous V-groove at said pair of ends having a depth equal to said fixed depth, said curved discontinuous V-groove being discontinuous between said pair of ends thereof,
- a curved continuous V-groove formed therein having a pair of ends terminating at said opposing sides, said curved continuous V-groove having a depth equal to said fixed depth, said curved continuous V-groove being oriented, when said V-block is in a switched position, with said one of said V-grooves of said first pair and said other of said V-grooves of said second pair,
- said curved discontinuous V-groove being oriented, when said V-block is in said switched position, with said other of said V-grooves of said first pair and said one of said V-grooves of said second pair;

a first fiber segment residing in said straight continuous V-groove of said V-block having a first end at said one of said opposing sides and having a second end at said other of said opposing sides;

a second fiber segment coupled to said first discontinuous V-groove of said V-block having a first end thereof at said one of said opposing sides, having a second end thereof at said other of said opposing sides, and having a mid-portion thereof overlapping said first fiber segment;

a third fiber segment coupled to said curved discontinuous V-groove having a first end thereof at said one of said opposing sides, having a second end thereof at said other of said opposing sides, and a mid-portion thereof overlapping both said first fiber segment and said second fiber segment; and a fourth fiber segment residing in said curved continuous V-groove of said V-block having a first end at said one of said opposing sides and having a second end at said other of said opposing sides.

said fiber segments at their said first ends having fiber end faces lying in a third common plane, said third common plane being in close proximity to and parallel with said first common plane, and said fiber segments at their said second ends having fiber end faces lying in a fourth common plane, said fourth common plane being in close proximity to and parallel with said second common plane.

10. The apparatus as recited in claim 9 wherein said fiber end faces lie in parallel planes.

11. The apparatus as recited in claim 10 further comprising means for limiting movement of said V-block with respect to said base; and means for moving said V-block with respect to said base.

12. A fully-reversing 2×2 electromechanical optical switch apparatus in which input optical signals carried on input optical fibers 150 and 250 can be selectively transmitted to output optical fibers 151 and 251 or to said optical fibers 251 and 151, respectively, comprising a first base having a planar surface terminating at a first linear side thereof, said surface of said base having formed therein a first pair of continuous parallel V-grooves having a fixed depth and being spaced apart a fixed distance, terminating at said linear side, and a second pair of continuous parallel V-grooves having a depth equal to said fixed depth, and being spaced apart said fixed distance, terminating at said linear side, one of said second pair of V-grooves being located a short distance from one of said first pair of V-grooves;

a second base having a planar surface terminating at a linear side thereof, said second base being movable with respect to said first base, with both of said sides being in abutting but sliding relationship along a linear direction along said sides, said surface of said second base having formed therein a first pair of continuous parallel V-grooves having a fixed depth corresponding to said first base fixed depth and being spaced apart a fixed distance corresponding to said first base fixed distance, terminating at said linear side of said second base, and a second pair of continuous parallel V-grooves having a fixed depth corresponding to said first base fixed depth, and being spaced apart said fixed distance, terminating at said linear side of said second base, one of said second pair of V-grooves of said second base being located said short distance from one of said first pair of V-grooves of said second base;

a first pair of optical fibers 150, 251 cemented in place in said first pair of parallel V-grooves of said first base having end faces thereof terminating at said first linear side of said first base;

a first fiber segment coupled to said second pair of parallel V-grooves of said first base, with end faces of said segment terminating at said first linear side, said first fiber segment being cemented to said second pair of V-grooves of said first base to have end portions of said segment rest therewithin, with a mid, bight portion of said fiber segment without said first base;

a second pair of optical fibers 151, 250 cemented in place in said first pair of parallel V-grooves of said second base having end faces thereof terminating at said linear side of said second base; and a second fiber segment coupled to said second pair of parallel V-grooves of said second base, with end faces of said second segment terminating at said linear side of said second base, said second fiber segment being cemented to said second pair of V-grooves of said second base to have end portions thereof rest therewithin, with a mid, bight portion of said second fiber segment without said second base.

13. The apparatus as recited in claim 12 wherein said fiber end faces lie in parallel planes.

14. The apparatus as recited in claim 13 further comprising means for limiting movement of said second base with respect to said first base, and means for moving said second base with respect to said first base.

15. The apparatus as recited in claim 14 further comprising housing means for enclosing said first base, said second base, said first fiber segment, said second fiber segment, and said means for limiting movement.

* * * * *

UNITED STATES PATENT AND TRADEMARK OFFICE
CERTIFICATE OF CORRECTION

PATENT NO. : 4,859,022
DATED : August 22, 1989
INVENTOR(S) : Barry J. Opdahl et al It is certified that error appears in the above—identified patent and that said Letters Patent is hereby corrected as shown below:

On the cover page, Item 75, Douglas H. Hooren should be Douglas H. Hoover

Signed and Sealed this

Seventh Day of August, 1990

Attest:

HARRY F. MANBECK, JR.

*Attesting Officer*   *Commissioner of Patents and Trademarks*